United States Patent
Davis et al.

(10) Patent No.: US 11,500,474 B2
(45) Date of Patent: Nov. 15, 2022

(54) AIRCRAFT SYSTEM AND METHOD TO MOVE CURSOR TO DEFAULT POSITION WITH HARDWARE BUTTON

(71) Applicant: Rockwell Collins, Inc., Cedar Rapids, IA (US)

(72) Inventors: Jason Davis, Marengo, IA (US); Marcin Kolesinski, Central City, IA (US); Travis S Vanderkamp, Marion, IA (US)

(73) Assignee: Rockwell Collins Inc., Cedar Rapids, IA (US)

( * ) Notice: Subject to any disclaimer, the term of this patent is extended or adjusted under 35 U.S.C. 154(b) by 0 days.

(21) Appl. No.: 17/209,955

(22) Filed: Mar. 23, 2021

(65) Prior Publication Data
US 2021/0333888 A1 Oct. 28, 2021

Related U.S. Application Data

(60) Provisional application No. 63/015,161, filed on Apr. 24, 2020.

(51) Int. Cl.
| | |
|---|---|
| *G06F 3/048* | (2013.01) |
| *G06F 3/033* | (2013.01) |
| *B64D 43/00* | (2006.01) |
| *G06F 3/0482* | (2013.01) |
| *G06F 3/04892* | (2022.01) |

(52) U.S. Cl.
CPC ............. *G06F 3/033* (2013.01); *B64D 43/00* (2013.01); *G06F 3/0482* (2013.01); *G06F 3/04892* (2013.01)

(58) Field of Classification Search
CPC .... G06F 3/033; G06F 3/04892; G06F 3/0482; B64D 43/00
See application file for complete search history.

(56) References Cited

U.S. PATENT DOCUMENTS

| | | | |
|---|---|---|---|
| 6,784,869 B1 | 8/2004 | Clark et al. | |
| 6,995,746 B2 | 2/2006 | Aymeric | |
| 7,212,890 B2 | 5/2007 | Lafon et al. | |
| 8,633,913 B1 * | 1/2014 | Raghu | G08G 5/0021 |
| | | | 345/173 |
| 9,115,995 B1 | 8/2015 | Owen et al. | |

(Continued)

FOREIGN PATENT DOCUMENTS

| | | | | |
|---|---|---|---|---|
| CA | 2243292 A1 * | 7/1997 | ........... | G08G 5/0034 |
| GB | 2559842 B | 12/2020 | | |

(Continued)

OTHER PUBLICATIONS

Extended Search Report for European Application No. 21170542.1 dated Sep. 23, 2021, 12 pages.

*Primary Examiner* — Towfiq Elahi
(74) *Attorney, Agent, or Firm* — Suiter Swantz pc llo

(57) ABSTRACT

A system may include a display installed in an aircraft, a hardware button installed in the aircraft, and a processor installed in the aircraft, wherein the processor may be communicatively coupled to the display and to the hardware button. The processor may be configured to: output at least one view to the display; receive a user input from the hardware button; and based at least on the user input, cause a cursor to move to a default position on one of the at least one view.

7 Claims, 6 Drawing Sheets

(56) References Cited

U.S. PATENT DOCUMENTS

| | | | |
|---|---|---|---|
| 10,168,876 | B2 | 1/2019 | Kaprani et al. |
| 2008/0178124 | A1 | 7/2008 | Kondo et al. |
| 2018/0181299 | A1* | 6/2018 | Ouellette ............ G06F 3/04892 |

FOREIGN PATENT DOCUMENTS

| | | |
|---|---|---|
| JP | 1990204787 A | 8/1990 |
| JP | 1994168001 A | 6/1994 |

* cited by examiner

AIRCRAFT SYSTEM AND METHOD TO MOVE CURSOR TO DEFAULT POSITION WITH HARDWARE BUTTON

CROSS-REFERENCE TO RELATED APPLICATIONS

The present application is related to and claims priority from: U.S. Application Ser. No. 63/015,161, titled AIRCRAFT SYSTEM AND METHOD TO MOVE CURSOR TO DEFAULT POSITION WITH HARDWARE BUTTON, filed Apr. 24, 2020. U.S. Application Ser. No. 63/015,161 is herein incorporated by reference in its entirety.

BACKGROUND

Current methods of cursor positioning on aircraft displays use a cursor control device, such as a trackball. Use of current cursor control devices typically require a pilot to interface head-down with the cursor control device for a significant amount of time to move the cursor to frequently needed locations. Such head-down operations can detract from a pilot's ability to perform other flight tasks.

SUMMARY

In one aspect, embodiments of the inventive concepts disclosed herein are directed to a system. The system may include a display installed in an aircraft, a hardware button installed in the aircraft, and a processor installed in the aircraft, wherein the processor may be communicatively coupled to the display and to the hardware button. The processor may be configured to: output at least one view to the display; receive a user input from the hardware button; and based at least on the user input, cause a cursor to move to a default position on one of the at least one view.

In a further aspect, embodiments of the inventive concepts disclosed herein are directed to a method. The method may include: outputting, by a processor, at least one view to a display, the processor being installed in an aircraft and communicatively coupled to the display and to a hardware button, the display being installed in the aircraft, the hardware button being installed in the aircraft; receiving, by the processor, a user input from the hardware button; and based at least on the user input, causing, by the processor, a cursor to move to a default position on one of the at least one view.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
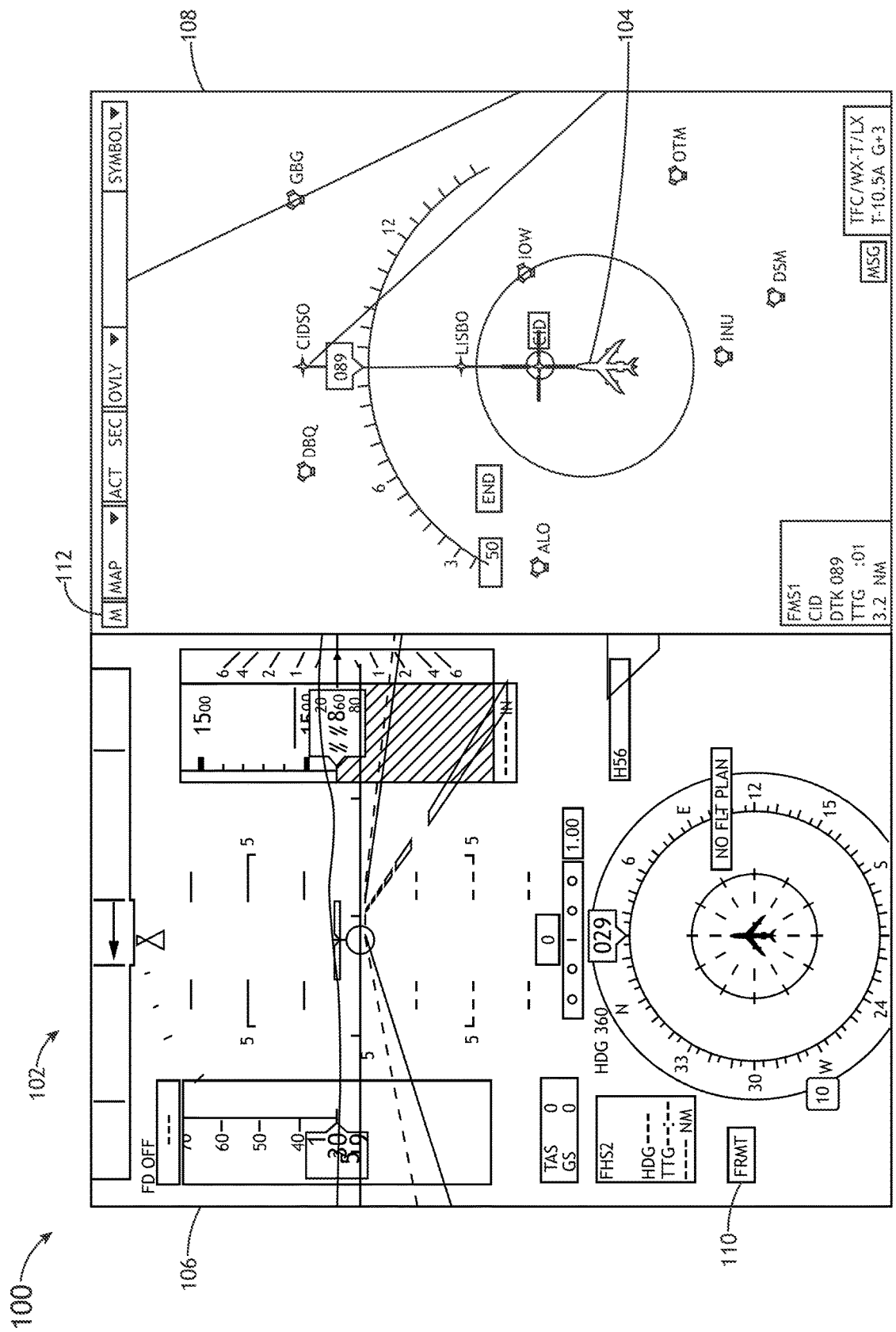
FIG. 1 is a view of an exemplary embodiment of a system including a display displaying a synthetic vision system (SVS) view and a map view according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to, based at least on a user input from a hardware button installed in an aircraft, cause a cursor to move to a default position on a view displayed by a display installed in the aircraft.

Figure 2:
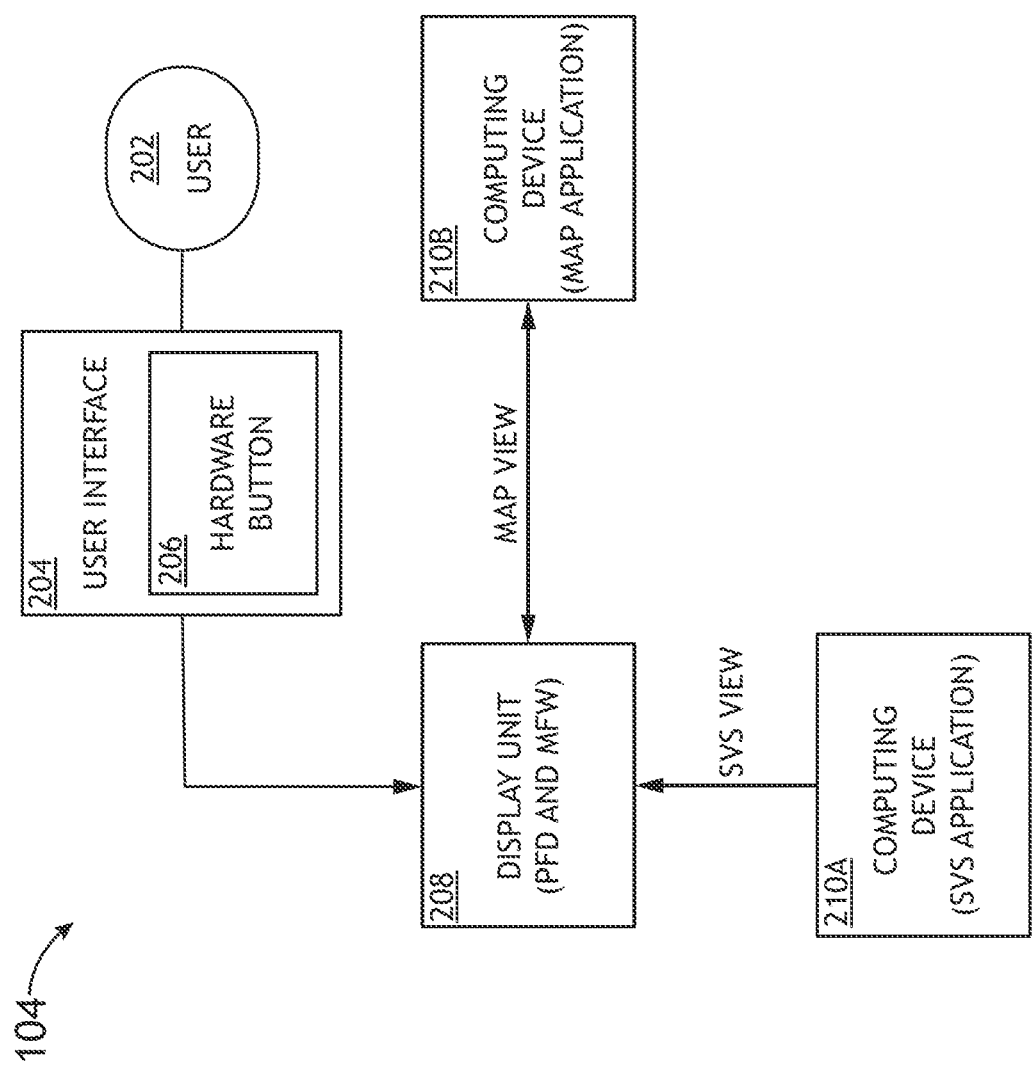
FIG. 2 is a view of an exemplary embodiment of a system according to the inventive concepts disclosed herein.

Referring now to FIG. 1, an exemplary embodiment of a system 100 including a display unit (e.g., 208, as shown in FIG. 2) displaying a view (e.g., a combined view 102), which may include a primary flight display (PFD) view (e.g., a synthetic vision system (SVS) view 106, an enhanced vision system (EVS) view, and/or a combined visions system (CVS) view) and a multi-function window (MFW) format view (e.g., a map view 108) according to the inventive concepts disclosed herein is depicted. For example, the MFW format view may include a flight management system (FMS) view, the map view 108, a synoptics view, and/or the like. The system 100 may include an aircraft 104, which is depicted in the map view 108.

The SVS view 106 may be an egocentric view of the area in front of the aircraft 104. The SVS view may include synthetically rendered scenery of the area in front of the aircraft 104. The SVS view 106 may include at least one SVS view soft button 110 (e.g., a format menu soft button). For example, one of the at least one SVS view soft button 110 (e.g., the format menu soft button) may be a default position (e.g., a second default position). In some embodiments, at least one other of the at least one SVS view soft button 110 may be at least one other default position.

The map view 108 may be an overhead view of a map including a location of the aircraft 104. The map view 108 may include at least one map view soft button 112 (e.g., a menu soft button). For example, one of the at least one map view soft button 112 (e.g., the menu soft button) may be a default position (e.g., a first default position). In some embodiments, at least one other of the at least one map view soft button 112 may be at least one other default position.

In some embodiments, at least one processor (e.g., 404 and/or 502) may be configured to perform (e.g., collectively perform if more than one processor): outputting the SVS view 106 and the map view 108 to the display unit (e.g., 208); receiving a user input from a hardware button (e.g., 206); based at least on the user input, cause a cursor to move to a first default position (e.g., one of the at least one map view soft button 112 (e.g., the menu soft button)) on the map view 108; receive a second user input from the hardware button (e.g., 206); and/or based at least on the second user input, cause the cursor to move to a second default position (e.g., one of the at least one SVS view soft button 110 (e.g., the format menu soft button)) on the SVS view 106.

In some embodiments, any number of default position(s) may be located at any suitable predetermined and/or user-defined location(s).

Referring now to FIGS. 2-5, an exemplary embodiment of the system 100 according to the inventive concepts disclosed herein is depicted. In some embodiments, the system may include the aircraft 104, which may include at least one user 202, at least one user interface 204, at least one display unit computing device 208, and/or at least one computing device 210 (e.g., at least one computing device 210A and/or at least one computing device 210B), some or all of which may be communicatively coupled at any given time. In some embodiments, the at least one display unit computing device 208 and/or the at least one computing device 210 may be implemented as a single computing device or any number of computing devices configured to perform (e.g., collectively perform if more than one computing device) any or all of the operations disclosed throughout.

Figure 3:
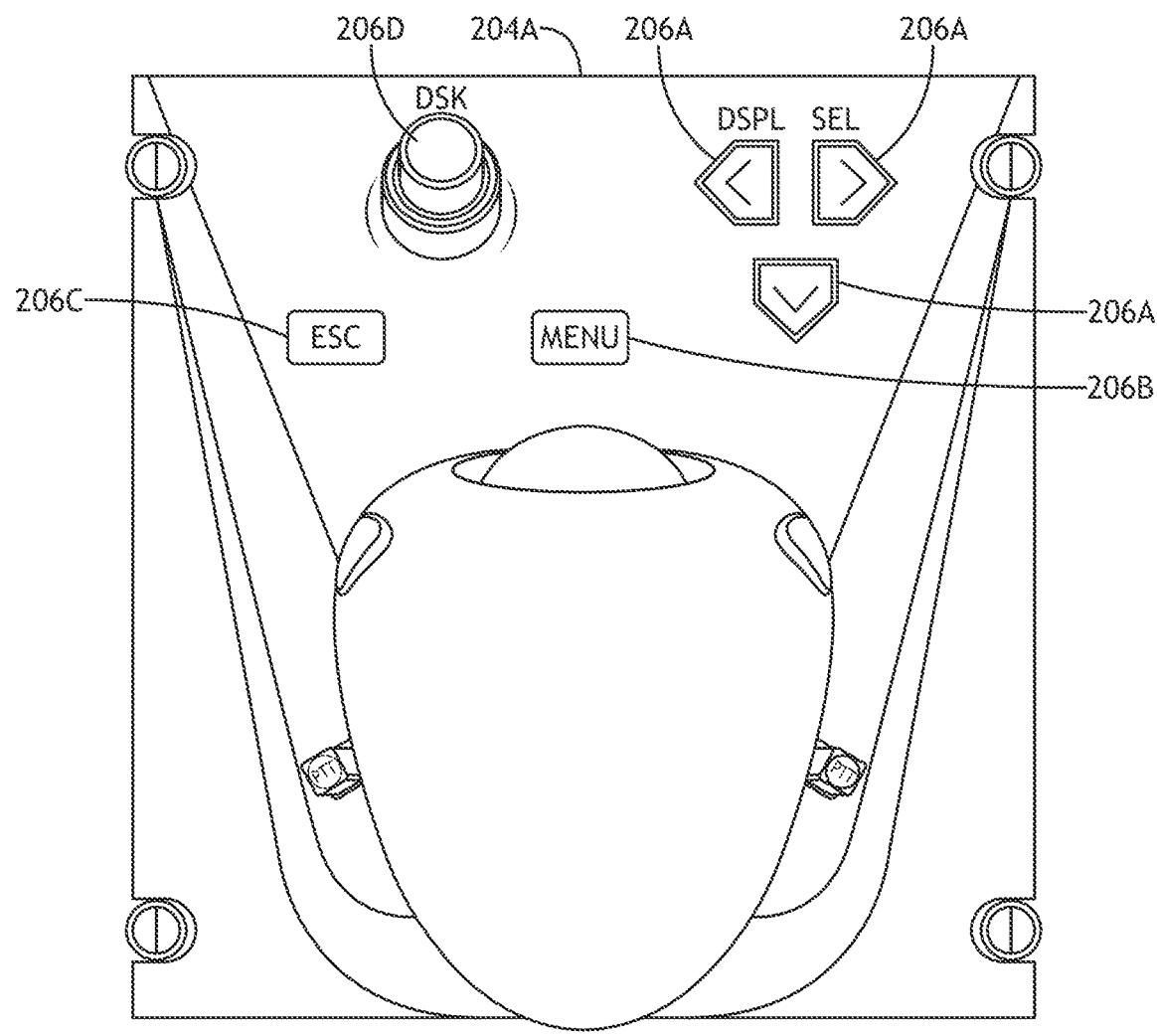
FIG. 3 is a view of an exemplary embodiment of a cursor control panel (CCP) of the system of FIG. 2 according to the inventive concepts disclosed herein.

The user 202 may be a pilot or crew member. The user 202 may interface with the system 100 via the at least one user interface 204. The at least one user interface 204 may be implemented as any suitable user interface, such as a touchscreen (e.g., of the display unit computing device 208 and/or another display unit), a multipurpose control panel, a cursor control panel (CCP) 204A (sometimes referred to as a display control panel (DCP)), a keyboard, a mouse, a trackpad, another hardware button, a switch, an eye tracking system, and/or a voice recognition system. For example, the user interface 204 may include at least one hardware button 206. In some embodiments, the at least one user interface 204 may include a CCP 204A (as shown in FIG. 3), which may include a plurality of hardware buttons 206, such as at least one (e.g., three) display select key 206A, a menu button 206B, an escape button 206C, and/or a a double stack knob (DSK) 206D. The user interface 204 may be configured to receive at least one user input and to output the at least one user input to a computing device (e.g., the display unit computing device 208). For example, a pilot of the aircraft 104 may be able to press the hardware button 206 to cause a cursor to move to a first default position, and a subsequent press of the hardware button 206 may cause the cursor to move from the first default position to a second default position. For example, a first user input may cause a cursor to move to a first default position. For example, a second user input occurring within a predetermined amount of time (e.g., less than five seconds) may cause the cursor to move to a second default position. For example, if the cursor is currently at a first default position, a next user input may cause the cursor to move to a second default position. Any number of default positions may be navigated by pressing the hardware button 206 an appropriate amount of times and/or within a predetermined amount of time. In some embodiments, the hardware button 206 may be an existing hardware button, which may be reconfigured to have any of the functionality as disclosed throughout.

Figure 4:
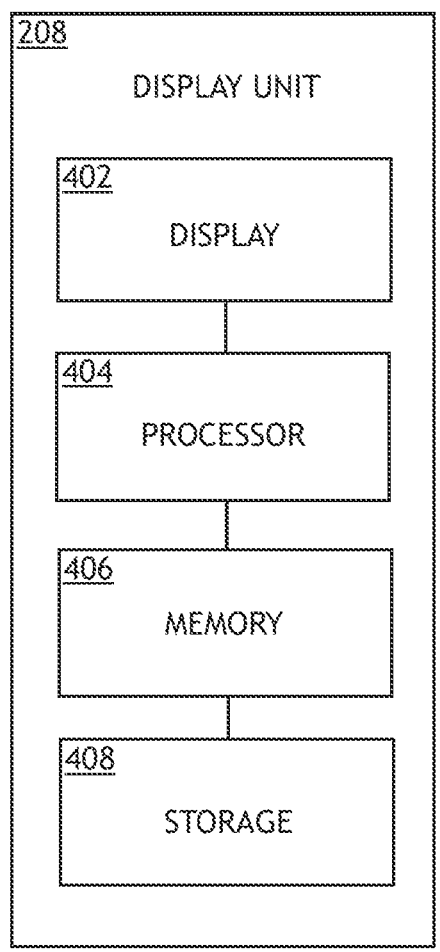
FIG. 4 is a view of an exemplary embodiment of a display unit computing device of the system of FIG. 2 according to the inventive concepts disclosed herein.

The display unit computing device 208 may be implemented as any suitable computing device, such as a primary flight display (PFD) computing device and/or a multi-function window (MFW) display computing device. As shown in FIG. 4, the display unit computing device 208 may include at least one display 402, at least one processor 404, at least one memory 406, and/or at least one storage 410, some or all of which may be communicatively coupled at any given time. For example, the at least one processor 404 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 404 may include a CPU and a GPU configured to perform (e.g., collectively perform) any of the operations disclosed throughout. The processor 404 may be configured to run various software applications (e.g., a PFD application and/or an MFW application) or computer code stored (e.g., maintained) in a non-transitory computer-readable medium (e.g., memory 406 and/or storage 410) and configured to execute various instructions or operations. The processor 404 may be configured to perform any or all of the operations disclosed throughout. For example, the processor 404 may be configured to: output at least one view (e.g., the SVS view 106 and/or the map view 108) to the at least one display (e.g., 402); receive a user input from the hardware button 206; based at least on the user input, cause a cursor to move to a default position on one of the at least one view; receive a second user input from the hardware button 206; and/or based at least on the second user input, cause the cursor to move to a second default position on one of the at least one view. The display 402 may be configured to display the at least one view (e.g., the SVS view 106 and/or the map view 108).

Figure 5:
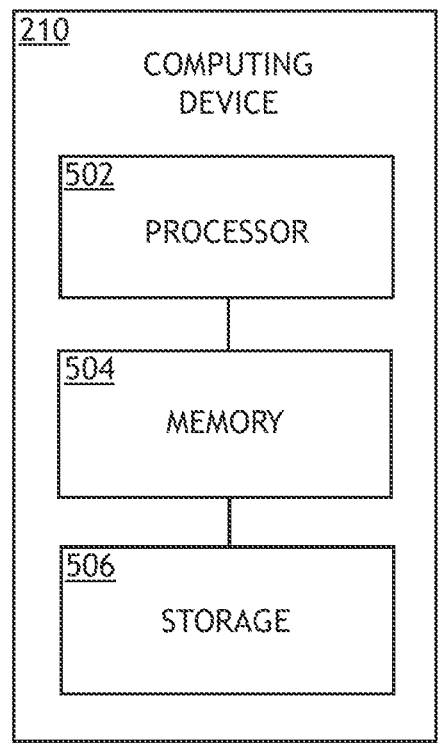
FIG. 5 is a view of an exemplary embodiment of a computing device of the system of FIG. 2 according to the inventive concepts disclosed herein.

The at least one computing device 210A may be implemented as any suitable computing device, such as an SVS computing device. The at least one computing device 210A may include any or all of the elements of the computing device 210, as shown in FIG. 5. For example, the computing device 210A may include at least one processor 502, at least one memory 504, and/or at least one storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., an SVS application) or computer code stored (e.g., maintained) in a non-transitory computer-readable medium (e.g., memory 504 and/or storage 506) and configured to execute various instructions or operations. The processor 502 of the computing device 210A may be configured to perform any or all of the operations disclosed throughout. For example, the processor 502 of the computing device 210A may be configured to: output the SVS view 106 to the display unit computing device 208.

The at least one computing device 210B may be implemented as any suitable computing device, such as a map computing device. The at least one computing device 2106 may include any or all of the elements of the computing device 210, as shown in FIG. 5. For example, the computing device 210B may include at least one processor 502, at least one memory 504, and/or at least one storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., a map application) or computer code stored (e.g., maintained) in a non-transitory computer-readable medium (e.g., memory 504 and/or storage 506) and configured to execute various instructions or operations. The processor 502 of the computing device 210B may be configured to perform any or all of the operations disclosed throughout. For example, the processor 502 of the computing device 210B may be configured to: output the map view 108 to the display unit computing device 208.

For example, at least one processor (e.g., the at least one processor 404, the at least one processor 502 of the at least one computing device 210A, and/or the at least one processor 502 of the at least one computing device 210B) may be configured to (e.g., collectively configured to, if more than one processor): output at least one view to the at least one display; receive a user input from the hardware button 206; based at least on the user input, cause a cursor to move to a default position on one of the at least one view; receive a second user input from the hardware button 206; and/or based at least on the second user input, cause the cursor to move to a second default position on one of the at least one view. In some embodiments, the at least one processor may be further configured to: based at least on the second user input occurring within a predetermined amount (e.g., less than five seconds) of time of the user input, cause the cursor to move to the second default position on one of the at least one view. In some embodiments, the at least one view is a first view and a second view, wherein the default position is on the first view, wherein the second default position is on the second view. In some embodiments, the at least one view may be any suitable view(s) displayed by a display unit.

For example, the at least one processor (e.g., the at least one processor 404, the at least one processor 502 of the at least one computing device 210A, and/or the at least one processor 502 of the at least one computing device 210B) may be configured to (e.g., collectively configured to, if more than one processor): output the SVS view 106 and the map view 108 to the at least one display 402; receive a user input from the hardware button 206; based at least on the user input, cause a cursor to move to a default position on one of the SVS view 106 and the map view 108; receive a second user input from the hardware button 206; and/or based at least on the second user input, cause the cursor to move to a second default position on one of the SVS view 106 and the map view 108. In some embodiments, the at least one processor may be further configured to: based at least on the second user input occurring within a predetermined amount of time (e.g., less than five seconds) of the user input, cause the cursor to move to the second default position on one of the SVS view 106 or the map view 108. In some embodiments, the default position is located at one of the at least one map view soft button 112 (e.g., the menu soft button), and the second default position is located at one of the at least one SVS view soft button 110 (e.g., the format menu soft button). In some embodiments, the hardware button 206 (e.g., a display select key 206A) is part of the CCP 204A.

At least one processor (e.g., the at least one processor 404, the at least one processor 502 of the at least one computing device 210A, and/or the at least one processor 502 of the at least one computing device 210B) of the aircraft 104 may be configured to perform (e.g., collectively perform) any or all of the operations disclosed throughout.

Figure 6:
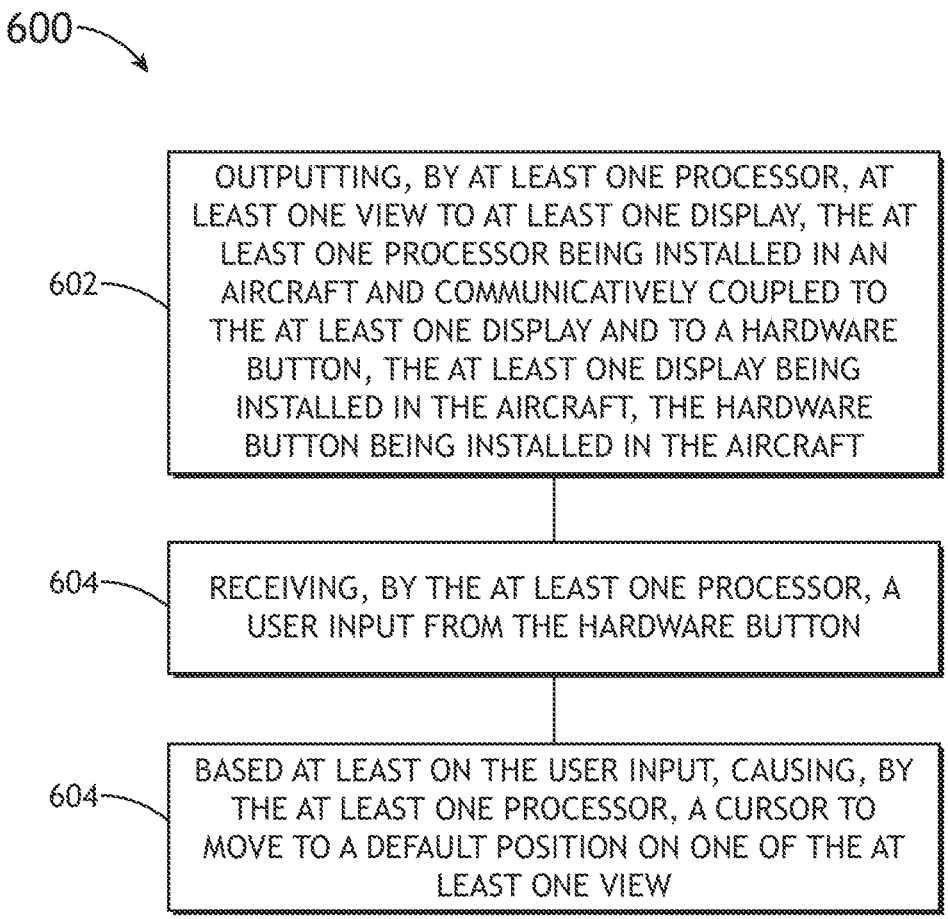
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include outputting, by at least one processor, at least one view to at least one display, the at least one processor being installed in an aircraft and communicatively coupled to the at least one display and to a hardware button, the at least one display being installed in the aircraft, the hardware button being installed in the aircraft.

A step 604 may include receiving, by the at least one processor, a user input from the hardware button.

A step 606 may include based at least on the user input, causing, by the at least one processor, a cursor to move to a default position on one of the at least one view.

Further, the method 600 may include any of the operations disclosed throughout.

As will be appreciated from the above, embodiments of the inventive concepts disclosed herein may be directed to a system and a method configured to, based at least on a user input from a hardware button installed in an aircraft, cause a cursor to move to a default position on a view displayed by a display installed in the aircraft.

As used throughout and as would be appreciated by those skilled in the art, "at least one non-transitory computer-readable medium" may refer to as at least one non-transitory computer-readable medium (e.g., memory 406, memory 504, storage 410, and/or storage 506; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a synthetic vision system (SVS) computing device configured to output an SVS view to a display unit computing device, the SVS view being an egocentric view of an area in front of an aircraft;
a map computing device configured to output a map view to the display unit computing device, the map view being an overhead view of a map including a location of the aircraft;
the display unit computing device installed in the aircraft, the display unit computing device including at least one display and at least one processor, wherein the display unit computing device is configured to: receive the SVS view from the SVS computing device; receive the map view from the map computing device; and display a combined view including the SVS view and the map view, the displayed SVS view including a format menu soft button, the displayed map view including a menu soft button;
a cursor control panel installed in the aircraft, the cursor control panel comprising: a display select key, wherein the display select key is a hardware button that is a depressible hardware button; and
wherein the at least one processor is communicatively coupled to the at least one display and to the hardware button, the at least one processor configured to:
output the combined view including the map view and the SVS view to the at least one display;
receive a user input from the hardware button; and
based at least on the user input from the hardware button, cause a cursor to move to one of the format menu soft button of the displayed SVS view or the menu soft button of the displayed map view.

2. The system of claim 1, wherein the SVS view is a primary flight display (PFD) view and the map view is a multi-function window (MFW) format view.

3. The system of claim 2, wherein a default position is on one of the SVS view or the map view.

4. The system of claim 3, wherein the at least one processor is further configured to: receive a second user input from the hardware button; and based at least on the second user input, cause the cursor to move to a second default position on one of the SVS view or the map view.

5. The system of claim 4, wherein the at least one processor being configured to based at least on the second user input, cause the cursor to move to the second default position on one of the SVS view or the map view, comprises the at least one processor being further configured to: based at least on the second user input occurring within a predetermined amount of time of the user input, cause the cursor to move to the second default position on one of the SVS view or the map view.

6. The system of claim 5, wherein the default position is located at one of the at least one map view soft button, wherein the second default position is located at one of the at least one SVS view soft button.

7. A method, comprising:
- outputting, by a synthetic vision system (SVS) computing device, an SVS view to a display unit computing device, the SVS view being an egocentric view of an area in front of an aircraft;
- outputting, by a map computing device, a map view to the display unit computing device, the map view being an overhead view of a map including a location of the aircraft;
- receiving, by the display unit computing device, the SVS view from the SVS computing device, the display unit computing device installed in the aircraft, the display unit computing device including at least one display and at least one processor;
- receiving, by the display unit computing device, the map view from the map computing device;
- displaying, by the display unit computing device, a combined view including the SVS view and the map view, the displayed SVS view including a format menu soft button, the displayed map view including a menu soft button;
- providing a cursor control panel installed in the aircraft, the cursor control panel comprising: a display select key, wherein the display select key is a hardware button that is a depressible hardware button, wherein the at least one processor is communicatively coupled to the at least one display and to the hardware button;
- outputting, by the at least one processor, the combined view including the map view and the SVS view to the at least one display;
- receiving, by the at least one processor, a user input from the hardware button; and
- based at least on the user input from the hardware button, causing, by the at least one processor, a cursor to move to one of the format menu soft button of the displayed SVS view or the menu soft button of the displayed map view.

\* \* \* \* \*